United States Patent
Jerwick et al.

(10) Patent No.: US 9,188,176 B2
(45) Date of Patent: Nov. 17, 2015

(54) TRANSMISSION WITH COUNTERSHAFT BRAKE AND METHOD FOR BRAKING A COUNTERSHAFT

(75) Inventors: John Jerwick, Hagerstown, MD (US); Michael E. Kahl, Hagerstown, MD (US)

(73) Assignee: Mack Trucks, Inc., Greensboro, NC (US)

( * ) Notice: Subject to any disclaimer, the term of this patent is extended or adjusted under 35 U.S.C. 154(b) by 18 days.

(21) Appl. No.: 14/233,894

(22) PCT Filed: Aug. 19, 2011

(86) PCT No.: PCT/US2011/048368
§ 371 (c)(1),
(2), (4) Date: Jan. 21, 2014

(87) PCT Pub. No.: WO2013/028151
PCT Pub. Date: Feb. 28, 2013

(65) Prior Publication Data
US 2014/0162844 A1 Jun. 12, 2014

(51) Int. Cl.
| | |
|---|---|
| F16H 3/08 | (2006.01) |
| F16D 55/40 | (2006.01) |
| F16D 57/06 | (2006.01) |
| F16H 3/12 | (2006.01) |
| B60W 10/11 | (2012.01) |
| B60W 10/196 | (2012.01) |

(52) U.S. Cl.
CPC .............. F16D 57/06 (2013.01); B60W 10/11 (2013.01); B60W 10/196 (2013.01); F16H 3/12 (2013.01); F16H 2003/123 (2013.01); Y10T 477/6394 (2015.01)

(58) Field of Classification Search
USPC .......................................... 74/325; 188/71.5
See application file for complete search history.

(56) References Cited

U.S. PATENT DOCUMENTS

| 3,309,934 | A | | 3/1967 | Gustafsson et al. |
| 4,211,313 | A | * | 7/1980 | Quick et al. ................. 192/221 |
| 4,618,042 | A | * | 10/1986 | Yamamoto ..................... 477/74 |
| 5,092,736 | A | * | 3/1992 | Herlitzek .................. 415/122.1 |
| 6,481,541 | B2 | * | 11/2002 | Taki et al. .................... 188/71.5 |

FOREIGN PATENT DOCUMENTS

DE 102007004182 A1 7/2008

OTHER PUBLICATIONS

International Search Report (Jan. 19, 2012) for corresponding International Application PCT/US2011/048368.

* cited by examiner

Primary Examiner — Ha D Ho
(74) Attorney, Agent, or Firm — WRB-IP LLP

(57) ABSTRACT

A transmission with a countershaft brake includes a countershaft, a positive displacement pump including a pump housing having a chamber with an inlet and an outlet, the pump being driven by the countershaft, and a flow restrictor disposed at or downstream of the chamber outlet, the flow restrictor being adjustable to increase and decrease an amount of flow restriction from, the outlet of the chamber. Torque needed to drive the pump increases with an increasing flow restriction by the flow restrictor. A method for braking a countershaft in a transmission is also provided.

17 Claims, 2 Drawing Sheets

TRANSMISSION WITH COUNTERSHAFT BRAKE AND METHOD FOR BRAKING A COUNTERSHAFT

BACKGROUND AND SUMMARY

The present invention relates generally to transmissions and, more particularly, to transmissions having countershaft brakes.

Heavy-duty vehicles often use non-synchronous manual transmissions that require a substantial level of operator skill. To avoid clashing of gears, it is necessary for an operator to control the speed of rotation of a drive gears on the drive shaft to match the speed of rotation of the collar that is supposed to engage with a particular one of the drive gears. The collars rotate with the drive shaft, while the drive gears are driven by countershaft gears which are driven by the engine through a clutch and an input shaft geared to the countershaft. During initial start-up when a stopped vehicle is to be shifted into first gear or reverse gear, and during an upshifting operation, it is generally necessary to slow or stop rotation of the countershaft so that rotation of the drive gears will be slowed or stopped. To facilitate shifting gears more quickly, clutch and countershaft brakes have been employed. These tend to involve substantial additional expense and inertia brakes are prone to wear.

It is desirable to provide an inexpensive countershaft brake. It is also desirable to provide a countershaft brake that is less prone to wear.

According to an aspect of the present invention, a transmission with a countershaft brake comprises a countershaft, a positive displacement pomp comprising a pump housing having a chamber with an inlet and an outlet, the pump being driven by the countershaft, and a flow restrictor disposed at or downstream of the chamber outlet, the flow restrictor being adjustable to increase and decrease an amount of flow restriction from the outlet of the chamber. Torque needed to drive the pump increases with an increasing flow restriction by the flow restrictor.

According to another aspect of the present invention, a method for braking a countershaft in a transmission comprises driving a positive displacement pump with the countershaft to pump liquid out of an outlet opening of the oil pump, and increasing resistance to driving of the pump.

BRIEF DESCRIPTION OF THE DRAWINGS

The features and advantages of the present invention are well understood by reading the following detailed description in conjunction with the drawings in which like numerals indicate similar elements and in which.

DETAILED DESCRIPTION

Figure 1:
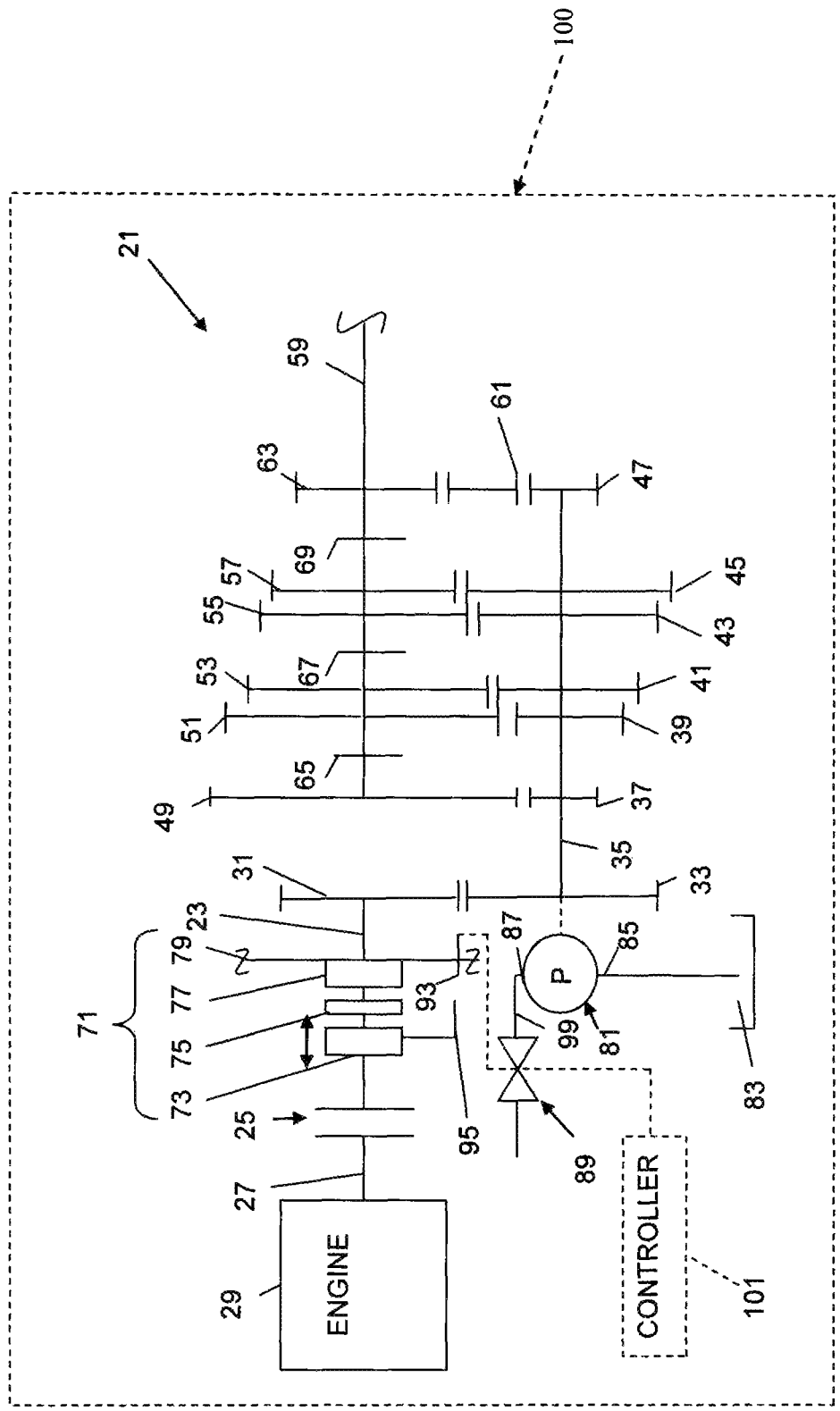
FIG. 1 is a schematic view of a transmission with a countershaft, brake according to an aspect of the present invention.

A non-synchronous manual transmission 21 of a type useful for illustrating an aspect of the present invention is shown schematically in FIG. 1 and includes an input shaft 23 and a master clutch 25 that, when engaged, couples the input shaft 23 with a crankshaft 27 of an engine 29. An input shaft gear 31 splined to the input shaft 23 meshes with a countershaft input gear 33 splined to a countershaft 35. The countershaft 35 typically has a plurality of countershaft drive gears 37, 39, 41, 43, 45, and 47 splined to the countershaft. The countershaft drive gears 37, 39, 41, 43, and 45 mesh with drive gears 49, 51, 53, 55, and 57, respectively, that ride on bearings on a driveshaft 59. The countershaft drive gear 47 meshes with an idler gear 61 that meshes with a drive gear 63 that rides on bearings on the driveshaft 59. Collars 65, 67, and 69 are splined to the driveshaft 59 and are slidable along the driveshaft by movement of a shift lever (not shown) and include teeth (not shown) that are adapted to engage with teeth on the drive gears to cause the driveshaft to rotate. When the collar 69 engages the drive gear 63, the drive shaft 59 is rotated in a direction opposite to its direction of rotation when a collar engages any of the other drive gears.

When a vehicle 100 (shown schematically by dotted lines) including such a transmission 21 is stopped, upon initial start-up, i.e., when it is sought to shift the transmission into first or reverse gear, the master clutch 25 is disengaged and rotation of the input shaft 23 and the countershaft 35 is stopped. After the input shaft 23 and countershaft 35 stop rotating, for first gear, the collar 65 is moved to engage with the drive gear 49 or, for reverse gear, the collar 69 is moved to engage with the drive gear 63. After the collar 65 engages the drive gear 49 or the collar 69 engages the drive gear 63, the master clutch 25 is engaged and the vehicle 100 moves in first or reverse gear, respectively.

When it is sought to shift the transmission 21 from one gear to a higher gear, i.e., upshift, the normal "double-clutch" procedure is to first disengage the master clutch 25. After the master clutch 25 is disengaged, the one of the collars 65, 67, and 69 that is engaged with a forward drive gear, i.e., 49, 51, 53, or 57 is moved out of engagement and to a neutral position. The master clutch 25 is then reengaged and the engine 100 is allowed to decelerate, which also reduces the rotational speed of the input shaft 23, countershaft 35, and the drive gears 49, 51, 53, 55, and 57 that mesh with the countershaft gears 37, 39, 41, 43, and 45 until the rotational speed of the higher drive gear 51, 53, 55, or 57 is substantially equal to the rotational speed of the drive shaft 59 and the collar 65, 67, or 69 with which the higher drive gear must engage. Ordinarily, the master clutch 25 is then disengaged a second time and the higher drive gear 51, 53, 55, or 57 is caused to engage with its collar 65, 67, or 69. After the higher drive gear 51, 53, 55, or 57 is engaged with its collar 65, 67, or 69, the master clutch 25 is reengaged.

To facilitate stopping or retarding rotation of the input shaft 23 and countershaft 35, a clutch brake 71 can be used. An illustrative clutch brake 71 includes a bearing housing 73 that rides on bearings on the input shaft 23. The bearing housing 73 is movable on the input shaft 23 to a clutch brake engaged position in which the hearing housing contacts a brake disc 75 splined to the input shaft to force it against a pad 77 fixed to a transmission housing 79 and thereby slow rotation of the input shaft 23 and, thereby, the countershaft 35 and the drive gears. The bearing housing 73 is also movable to a clutch brake disengaged position in which the bearing housing is not in contact with the brake disc 75, the brake disc is not in contact with the pad 77, and the input shaft 23 rotates freely relative to the transmission housing 79. The hearing housing 73 is ordinarily linked to a clutch pedal (not shown) for operating the master clutch 25. When the clutch pedal is not depressed, the master clutch 25 is engaged, when the clutch pedal is depressed, the master clutch 25 is disengaged, and, when the clutch pedal is depressed still further, the bearing housing 73 contacts the brake disc 75 to begin application of the clutch brake 71.

A pump, ordinarily a positive displacement oil pump 81 that draws oil from, e.g., a reservoir 83 and delivers it to the gears of the transmission 21, is driven by the countershaft. U.S. Pat. No. 3,309,934 discloses an oil pump comprising a gear pump driven by a countershaft and is incorporated by reference, however, the pump can be any positive displacement pump. It is presently contemplated that a positive displacement gear pump or gerotor pump will be particularly suitable for use as the pump 81.

Figure 2:
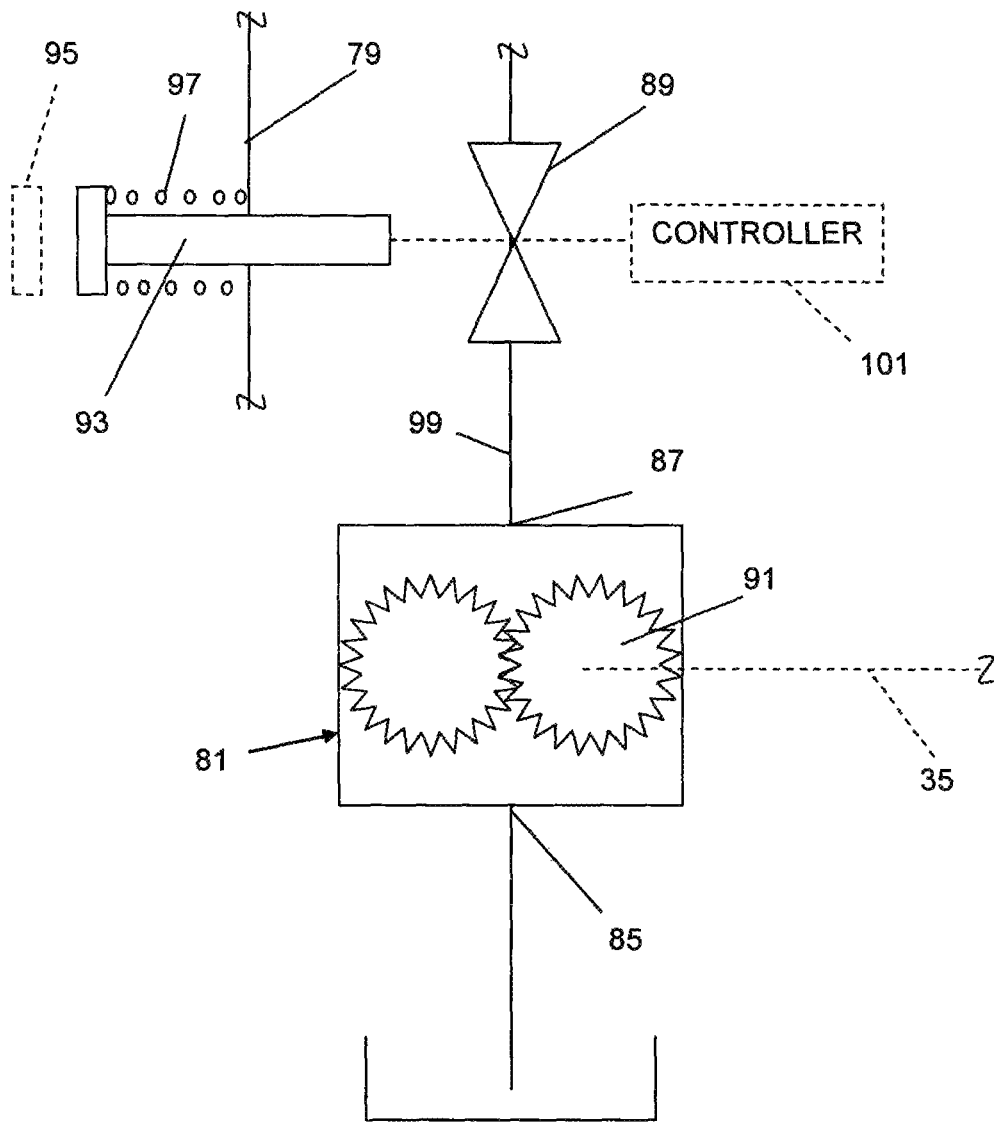
FIG. 2 is a schematic view of a countershaft brake according to an aspect of the present invention.

As seen in FIG. 2, the countershaft brake can include the pump 81, which can comprise a pump housing having a chamber with an inlet 85 and an outlet 87. A flow restrictor 89 is disposed at or downstream of the chamber outlet 87. The flow restrictor 89 is adjustable to increase and decrease an amount of flow restriction from the outlet of the chamber. Torque needed to drive the pump 81 increases with an increasing flow restriction by the flow restrictor 89 so that, by increasing the flow restriction, rotation of the countershaft 35 can be retarded. Where the pump 81 is a rotary pump as shown in FIG. 2, it can comprise a rotary member such as a gear 91 coupled to the countershaft 35, such as by being fixed proximate an end of and rotating with the countershaft.

For a conventional manual transmission 21 as shown in FIG. 1, the restrictor 89 will ordinarily comprise a valve. The valve can be operated in a variety of suitable ways, such as by providing a spring loaded plunger 93 mounted on the transmission housing 79. A portion 95 of the bearing housing 73 can contact and depress the plunger 93 when the clutch pedal is depressed. The plunger 93 can be spring loaded by a resilient member 97 so that, when the bearing housing 73 is moved away from the clutch brake engaged position toward the clutch brake disengaged position, the resilient member moves the plunger to decrease flow restriction by the flow restrictor 89. The portion 95 of the bearing housing 73 may be in the form of an arm that extends beyond the brake disc 75. Depression of the plunger 93 can cause a portion of the plunger to increase flow restriction downstream of the chamber outlet 87 by blocking a conduit 99 downstream of the chamber outlet, or other arrangements can be provided. For example, the plunger 93 can be mechanically linked to operate another valve 89, such as a gate or needle valve, or the plunger can comprise a piston movable in a cylinder to compress fluid used to hydraulically or pneumatically open and close a valve.

Instead of or in addition to mechanical operation by an arrangement such as the plunger described above, the restrictor 89 can be operated in response to signals from a controller 101 (shown by dotted lines) for controlling the flow restrictor to adjust the amount of flow restriction. While a controller 101 might be used in a manual transmission 21 as shown in FIG. 1, it is presently contemplated that it will be particularly useful to use a controller such as an ECU to operate the restrictor 89 in an automated manual transmission in which shifting of gears is also at least partially controlled by the controller. In such a transmission, the controller controls the flow restrictor to increase flow restriction during a gear shifting operation.

It is presently contemplated that the pump 81 and restrictor 89 arrangement will be particularly useful in conventional non-synchronous manual transmissions to facilitate retardation of the countershaft 35. However, the pump and restrictor may be useful in a variety of applications where it is desired to retard the countershaft, the input shaft, or the drive gears that mesh with countershaft gears. For example, the pump 81 and restrictor 89 may be useful in automated manual transmissions that will not ordinarily have clutch pedals like a conventional manual transmission.

In a method for braking a countershaft 35 in a transmission 21 according to an aspect of the invention, a positive displacement oil pump 81 is driven via the countershaft to pump liquid out of an outlet 87 of the pump. Resistance to driving of the pump 81 is increased, resulting in a corresponding resistance, to rotation of the countershaft 35 and tending to retard rotation of the countershaft.

Resistance to rotation of the countershaft 35 is increased by increasing a restriction to flow in a restriction 89 at or downstream of the outlet opening 87. The restriction to flow can be increased by closing a valve, which may be in any suitable form, such as in the form of a plunger 93 that closes off the outlet opening 87 or a conduit 99 downstream of the outlet opening, or that is linked to and opens and closes a valve via, e.g., mechanical linkages, or hydraulic or pneumatic lines. The restriction 89 can be a partial restriction or a complete restriction depending upon the amount that it is desired to retard rotation of the countershaft 35.

During a start-up operation from a condition during which a vehicle 100 having a transmission with a countershaft braking arrangement as disclosed here, the clutch 25 between the engine 29 and the input shaft 23 can be disengaged, and rotation of the input shaft 23 can be stopped. The input shaft 23 comprises an input shaft gear 31 that meshes with a gear 33 on the countershaft 35. At the time of or after stopping the vehicle 100, flow downstream of the outlet opening 87 of the pump 81 is completely restricted so that the countershaft 35 stops rotating. After the countershaft 35 stops rotating, gears in the transmission 21 are shifted to one of a first and a reverse gear.

If desired, rotation of the input shaft 23 can be stopped with a clutch brake 71 having a bearing housing 73 movable between a clutch brake engaged position and a clutch brake disengaged position. The clutch brake 71 and the flow restrictor 89 can be arranged so that movement of the bearing housing 73 from the clutch brake disengaged toward the clutch brake engaged position increases flow restriction by the flow restrictor, such as by a portion 95 of the bearing housing contacting means such as a plunger 93 to operate a valve at or downstream of the outlet opening 87. The valve may be operated by a mechanical, hydraulic, or pneumatic connection. Alternatively, the flow restriction 89 can be controlled by a controller 101 when a gear shifting operation is to be performed.

A shifting operation for upshifting between drive gears (e.g., from first, second, third, or fourth gear to second, third, fourth, or fifth gear) in the transmission 21 can be performed by a "double-clutching" operation as follows. The clutch 25 between the engine 29 and the input shaft 23 is disengaged. The drive gears are shifted to neutral while the clutch 25 is disengaged by shifting an engaged collar 65, 67, or 69 to a disengaged position. Rotation of the countershaft 35 is retarded by increasing the restriction to flow downstream of the outlet opening 87 via the restriction 89. Ordinarily, the restriction is only a partial restriction during an upshifting operation. A different amount of restriction might be appropriate depending upon circumstances such as terrain and vehicle load. After rotation of the countershaft 35 has been decreased so that a drive shaft gear 51, 53, 55, or 57 to which it is desired to shift and a collar 65, 67, or 69 for engagement with the gear rotate at approximately the same rotational speed, the drive shaft gear and the collar are engaged and the restriction 89 to flow downstream of the outlet opening 87 is released. After the drive shaft gear and the collar are engaged, the clutch 25 is reengaged. The flow restrictor 89 can be controlled mechanically, such as by mechanical linkages, hydraulic or pneumatic connections, or electrical controls.

The pump 81 and restrictor 89 that function as a countershaft brake do not require complex mechanical systems with parts that are prone to wear as in conventional countershaft brakes. Accordingly, the countershaft brake arrangement according to aspects of the present invention can be provided at minimal expense.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

While this invention has been illustrated and described in accordance with a preferred embodiment, it is recognized that variations and changes may be made therein without departing from the invention as set forth in the claims.

What is claimed is:

1. A transmission with a countershaft brake, comprising:
    a countershaft;
    a positive displacement pump comprising a pump housing having a chamber with an inlet and an outlet, the pump being driven by the countershaft; and
    a flow restrictor disposed at or downstream of the chamber outlet, the flow restrictor being adjustable to increase and decrease an amount of flow restriction from the outlet of the chamber,
    wherein torque needed to drive the pump increases with an increasing flow restriction by the flow restrictor.

2. The transmission with the countershaft brake as set forth in claim 1, wherein the pump is a rotary pump comprising a rotary member coupled to the countershaft.

3. The transmission with the countershaft brake as set forth in claim 1, comprising a clutch brake comprising a bearing housing movable between a clutch brake engaged position and a clutch brake disengaged position, wherein the clutch brake and the flow restrictor are arranged so that movement of the bearing housing from the clutch brake disengaged toward the clutch brake engaged position increases flow restriction by the flow restrictor.

4. The transmission with the countershaft brake as set forth in claim 3, wherein the restrictor comprises a plunger mounted on a transmission housing, a portion of the bearing housing contacts and moves the plunger to increase flow restriction by the flow restrictor.

5. The transmission with the countershaft brake as set forth in claim 4, wherein the plunger is spring loaded by a resilient member so that, when the bearing housing is moved away from the clutch brake engaged position toward the clutch brake disengaged position, the resilient member moves the plunger to decrease flow restriction by the flow restrictor.

6. The transmission with the countershaft brake as set forth in claim 1, comprising a controller for controlling the flow restrictor to adjust the amount of flow restriction.

7. The transmission with the countershaft brake as set forth in claim 6, wherein the transmission is an automated manual transmission in which shifting of gears is at least partially controlled by the controller, and wherein the controller controls the flow restrictor to increase flow restriction during a gear shifting operation.

8. The transmission with the countershaft brake as set forth in claim 1, wherein the flow restrictor comprises a valve that is at least one of hydraulically, pneumatically, and electrically opened and closed.

9. The transmission with the countershaft brake as set forth in claim 1, wherein the transmission is a non-synchronous transmission.

10. The transmission with the countershaft brake as set forth in claim 1, wherein the transmission is an automated manual transmission.

11. A method for braking a countershaft in a transmission, comprising:
    driving a positive displacement pump with the countershaft to pump liquid out of an outlet opening of the oil pump; and
    increasing resistance to driving of the pump, wherein resistance is increased by increasing a restriction to flow at or downstream of the outlet opening.

12. The method for braking the countershaft as set forth in claim 11, comprising increasing the restriction by closing a valve.

13. The method for braking the countershaft as set forth in claim 11, comprising completely restricting flow downstream of the outlet opening.

14. The method for braking the countershaft as set forth in claim 11, comprising
    disengaging a clutch between an engine and an input shaft and stopping rotation of the input shaft, the input shaft comprising an input shaft gear that meshes with a gear on the countershaft,
    at the time of or after stopping the vehicle, completely restricting flow downstream of the outlet opening so that the countershaft stops rotating,
    after the countershaft stops rotating, shifting gears in the transmission to one of a first and a reverse gear.

15. The method for braking the countershaft as set forth in claim 14, comprising stopping rotation of the input shaft with a clutch brake having a bearing housing movable between a clutch brake engaged position and a clutch brake disengaged position, wherein the clutch brake and the flow restrictor are arranged so that movement of the bearing housing from the clutch brake disengaged toward the clutch brake engaged position increases flow restriction by the flow restrictor.

16. The method for braking the countershaft as set forth in claim 11, comprising upshifting between drive gears in the transmission by
    disengaging a clutch between an engine and an input shaft, the input shaft comprising an input shaft gear that meshes with a gear on the countershaft,
    shifting the drive gears from a first drive gear to neutral while the clutch is disengaged,
    retarding rotation of the countershaft by increasing the restriction to flow downstream of the outlet opening,
    after rotation of the countershaft has been decreased, engaging a second drive gear higher than the first drive gear and decreasing the restriction to flow downstream of the outlet opening, and
    after the countershaft gear and the drive shaft gear are engaged, reengaging the clutch.

17. The method for braking the countershaft as set forth in claim 15, stopping rotation of the input shaft with a clutch brake having a bearing housing movable between a clutch brake engaged position and a clutch brake disengaged position, wherein the clutch brake and the flow restrictor are arranged so that movement of the bearing housing from the clutch brake disengaged toward the clutch brake engaged position increases flow restriction by the flow restrictor.

* * * * *